(12) United States Patent
Oomura

(10) Patent No.: US 8,243,300 B2
(45) Date of Patent: Aug. 14, 2012

(54) PRINTING SYSTEM, PRINTING METHOD AND PRINTER WHICH FACILITATE PRINT MANAGEMENT USING AUTHORIZATION TOKENS

(75) Inventor: Hiroshi Oomura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 876 days.

(21) Appl. No.: 12/357,658

(22) Filed: Jan. 22, 2009

(65) Prior Publication Data

US 2009/0207439 A1 Aug. 20, 2009

(30) Foreign Application Priority Data

Feb. 20, 2008 (JP) ................................. 2008-039096

(51) Int. Cl.
*G06F 15/00* (2006.01)
*G06K 1/00* (2006.01)
*G06K 15/00* (2006.01)
*G06F 3/12* (2006.01)

(52) U.S. Cl. ...................................... 358/1.14; 358/1.15

(58) Field of Classification Search ........................ None
See application file for complete search history.

(56) References Cited

U.S. PATENT DOCUMENTS

| 7,509,497 B2 | 3/2009 | Joy et al. |
| 7,686,525 B2 | 3/2010 | Uchida |
| 7,990,558 B2 * | 8/2011 | Nakata ........................ 358/1.15 |
| 2007/0103712 A1 | 5/2007 | Corona |
| 2007/0172281 A1 | 7/2007 | Inoue et al. |
| 2007/0226808 A1 | 9/2007 | Uchikawa |
| 2007/0229886 A1 * | 10/2007 | Sakurai ....................... 358/1.15 |
| 2007/0253014 A1 | 11/2007 | Nakata |

FOREIGN PATENT DOCUMENTS

| EP | 1840727 A | 10/2007 |
| JP | 2007-150336 | 5/2003 |
| JP | 2007-293703 | 11/2008 |
| KR | 1020060048474 A | 5/2006 |
| KR | 1020070096906 A | 10/2007 |
| KR | 1020070098740 A | 10/2007 |

* cited by examiner

*Primary Examiner* — Douglas Tran
(74) *Attorney, Agent, or Firm* — Fitzpatrick, Cella, Harper & Scinto

(57) ABSTRACT

A printing system can suppress an increase in the processing load of a printer, and facilitate print management. To accomplish this, a printing system includes an authentication unit with which a printer authenticates a user based on account information the user inputs using a host device, a token generating unit with which the printer generates, after the user has been authenticated by the authentication unit, a token containing print function restriction information by referring to information in which the user, and application and the print function restriction are associated with one another, and transmits the token to the host device, a command generating unit with which the host device receives the token to generate a command containing the print function restriction information, and transmits the command to the printer, and a printing unit with which the printer receives the command and executes printing subject to print function restrictions.

5 Claims, 16 Drawing Sheets

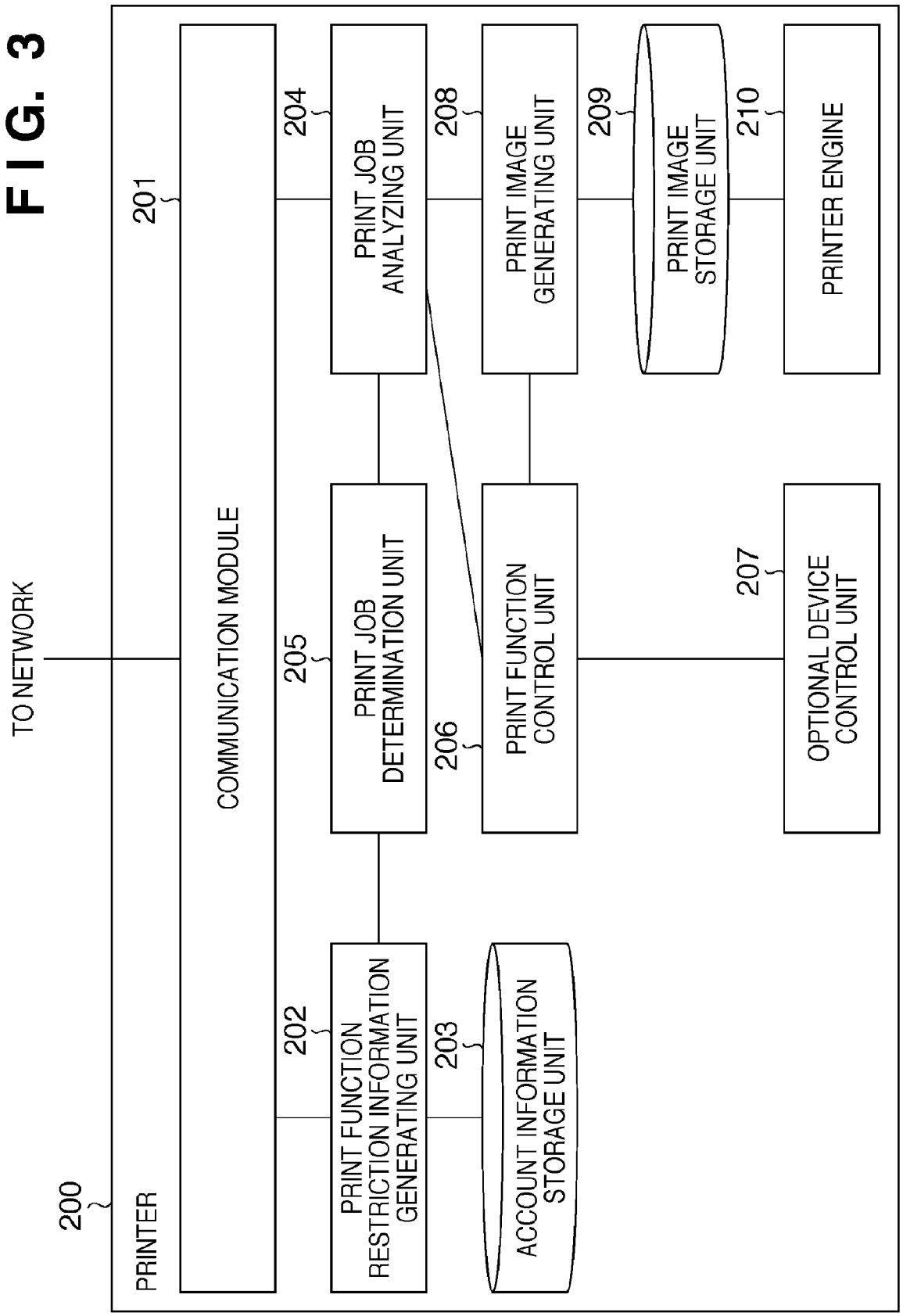

FIG. 4

| USER | PASSWORD | GROUP 1 | GROUP 2 |
|---|---|---|---|
| USER A | XXXX | SUPERVISOR | GENERAL |
| USER B | AAAA | GENERAL | – |
| USER C | BBBB | GUEST | – |
| ... | ... | ... | ... |

400 / 401 / 402

| GROUP | APPLICATION | PRINT MODULE | PRINTING PERMISSION | ONE-SIDE PRINTING PERMISSION | COLOR PRINTING PERMISSION | Nup PRINTING PERMISSION |
|---|---|---|---|---|---|---|
| SUPERVISOR | – | – | Yes | Yes | Yes | 2up |
| | SCHEDULER | schedule.exe | Yes | Yes | Yes | 1up |
| | BUDGET MANAGEMENT | budget.exe | Yes | No | No | 2up |
| GENERAL | – | – | Yes | No | No | 2up |
| | SCHEDULER | schedule.exe | Yes | Yes | Yes | 1up |
| GUEST | – | – | No | No | No | 4up |
| ... | | | ... | ... | ... | ... |

410 / 411 / 412 / 413 / 414 / 415

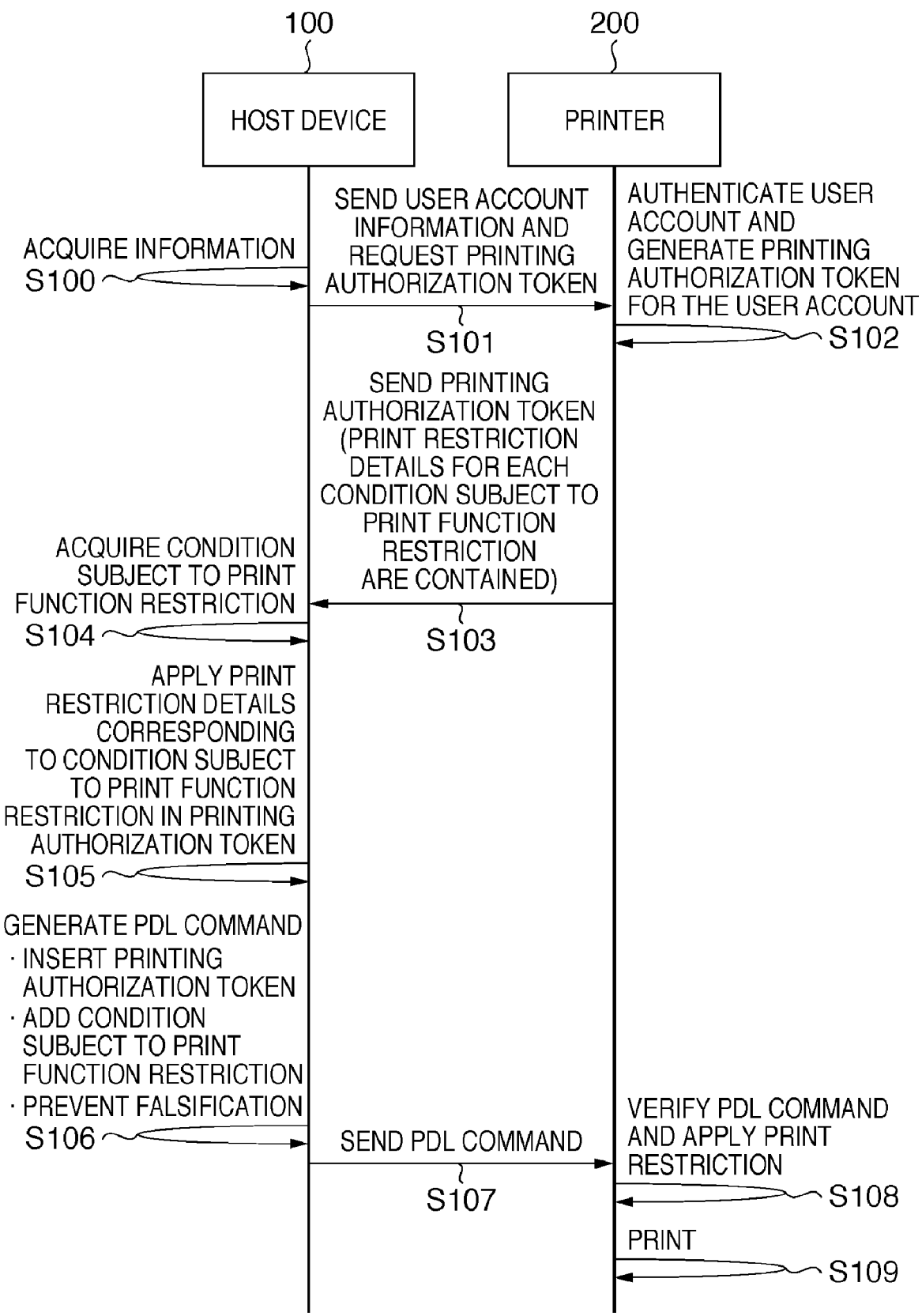

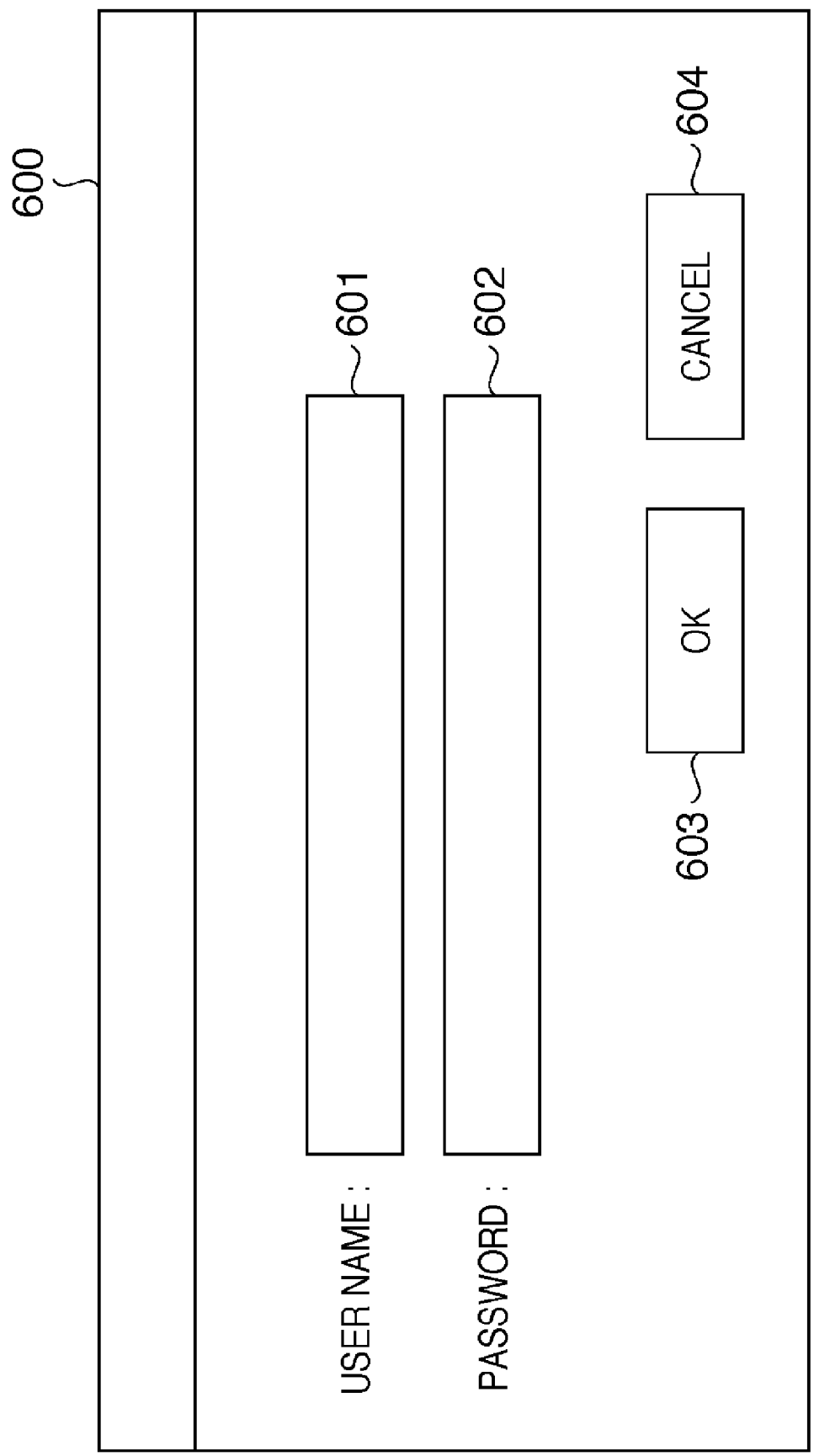

FIG. 7

USER A
500

```
<PRINT RESTRICTION TICKET>
  <PERMISSION DETAILS>
    <ACCOUNT NAME> USER A </ACCOUNT NAME>
     <GENERAL PRINT>
       <PRINTING PERMISSION> Yes </PRINTING PERMISSION>
       <ONE-SIDE PRINTING PERMISSION> Yes </ONE-SIDE PRINTING PERMISSION>
       <COLOR PRINTING PERMISSION> Yes </COLOR PRINTING PERMISSION>
       <Nup PRINTING PERMISSION> 2 </Nup PRINTING PERMISSION>
     </GENERAL PRINT>
    <APPLICATION PERMISSION MODULE NAME="schedule.exe">
       <GENERAL NAME> SCHEDULER </GENERAL NAME>
       <PRINTING PERMISSION> Yes </PRINTING PERMISSION>
       <ONE-SIDE PRINTING PERMISSION> Yes </ONE-SIDE PRINTING PERMISSION>
       <COLOR PRINTING PERMISSION> Yes </COLOR PRINTING PERMISSION>
       <Nup PRINTING PERMISSION> 1 </Nup PRINTING PERMISSION>
    </APPLICATION PERMISSION>
    <APPLICATION PERMISSION MODULE NAME="Budget.exe">
       <GENERAL NAME> BUDGET MANAGEMENT</GENERAL NAME>
       <PRINTING PERMISSION> Yes </PRINTING PERMISSION>
       <ONE-SIDE PRINTING PERMISSION> No </ONE-SIDE PRINTING PERMISSION>
       <COLOR PRINTING PERMISSION> No </COLOR PRINTING PERMISSION>
       <Nup PRINTING PERMISSION> 2 </Nup PRINTING PERMISSION>
    </APPLICATION PERMISSION>
  </PERMISSION DETAILS>
  <SIGNATURE> XXXXX </SIGNATURE>
</PRINT RESTRICTION TICKET>
```

USER B
510

```
<PRINT RESTRICTION TICKET>
  <PERMISSION DETAILS>
    <ACCOUNT NAME> USER B </ACCOUNT NAME>
     <GENERAL PRINT>
       <PRINTING PERMISSION> Yes </PRINTING PERMISSION>
       <ONE-SIDE PRINTING PERMISSION> No </ONE-SIDE PRINTING PERMISSION>
       <COLOR PRINTING PERMISSION> No </COLOR PRINTING PERMISSION>
       <Nup PRINTING PERMISSION> 2 </Nup PRINTING PERMISSION>
     </GENERAL PRINT>
    <APPLICATION PERMISSION MODULE NAME="schedule.exe">
       <GENERAL NAME> SCHEDULER </GENERAL NAME>
       <PRINTING PERMISSION> Yes </PRINTING PERMISSION>
       <ONE-SIDE PRINTING PERMISSION> Yes </ONE-SIDE PRINTING PERMISSION>
       <COLOR PRINTING PERMISSION> Yes </COLOR PRINTING PERMISSION>
       <Nup PRINTING PERMISSION> 1 </Nup PRINTING PERMISSION>
    </APPLICATION PERMISSION>
  </PERMISSION DETAILS>
  <SIGNATURE> XXXXX </SIGNATURE>
</PRINT RESTRICTION TICKET>
```

| USER | PASSWORD | GROUP |
|---|---|---|
| USER A | XXXX | GENERAL AFFAIRS |
| USER B | AAAA | GENERAL AFFAIRS |
| USER C | BBBB | SALES |
| ... | | |

1110

| GROUP | APPLICATION | PRINT MODULE | PRINTING PERMISSION | ONE-SIDE PRINTING PERMISSION | COLOR PRINTING PERMISSION | Nup PRINTING PERMISSION |
|---|---|---|---|---|---|---|
| GENERAL AFFAIRS | - | - | Yes | Yes | Yes | 2up |
| | SCHEDULER | schedule.exe | Yes | Yes | Yes | 1up |
| | BUDGET MANAGEMENT | budget.exe | Yes | No | No | 2up |
| SALES | - | - | Yes | No | No | 2up |
| | SCHEDULER | schedule.exe | Yes | Yes | Yes | 1up |
| GUEST | - | - | No | No | No | 4up |
| ... | | | | | | ... |

FIG. 14

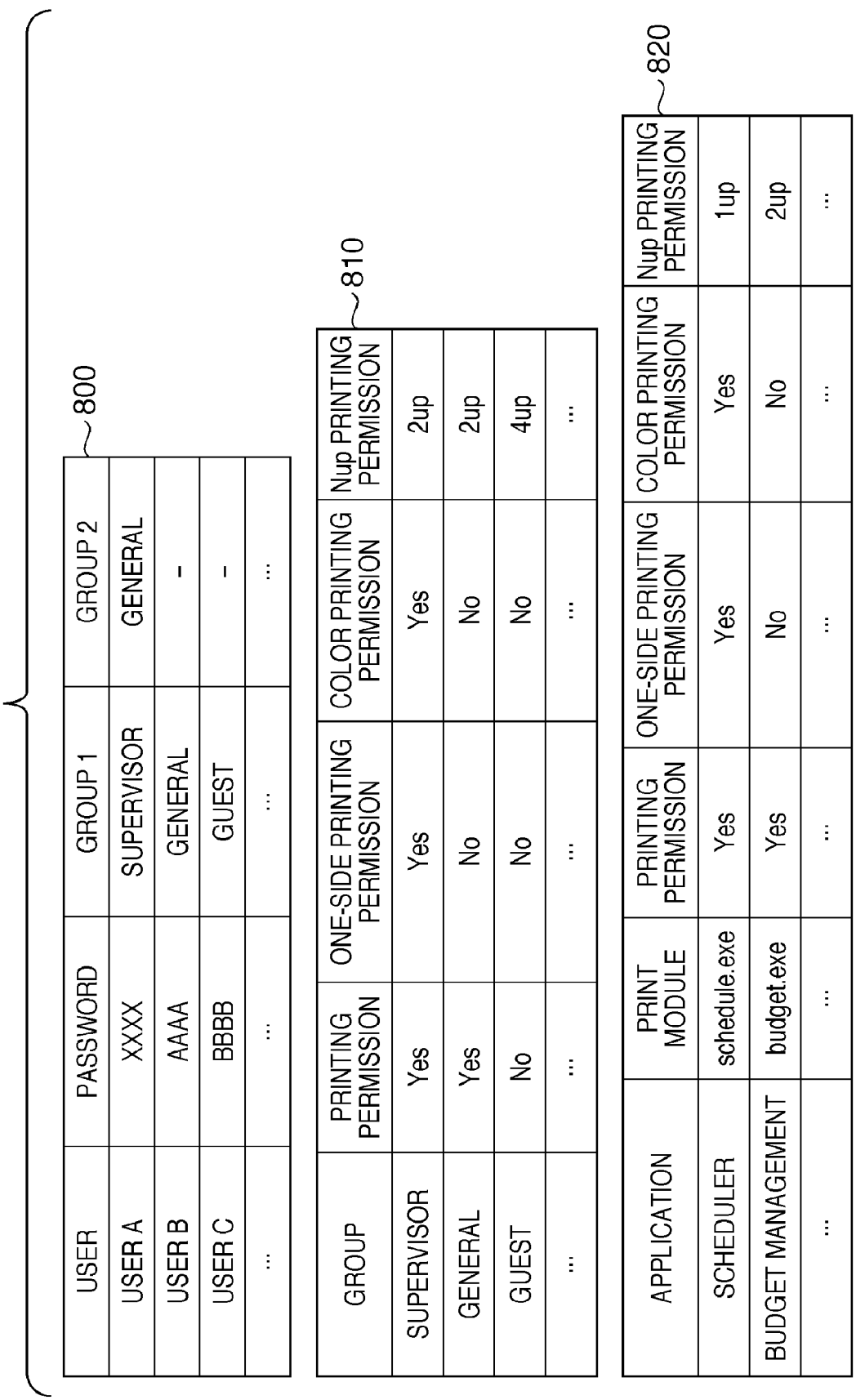

800

| USER | PASSWORD | GROUP 1 | GROUP 2 |
|---|---|---|---|
| USER A | XXXX | SUPERVISOR | GENERAL |
| USER B | AAAA | GENERAL | - |
| USER C | BBBB | GUEST | - |
| ... | ... | ... | ... |

810

| GROUP | PRINTING PERMISSION | ONE-SIDE PRINTING PERMISSION | COLOR PRINTING PERMISSION | Nup PRINTING PERMISSION |
|---|---|---|---|---|
| SUPERVISOR | Yes | Yes | Yes | 2up |
| GENERAL | Yes | No | No | 2up |
| GUEST | No | No | No | 4up |
| ... | ... | ... | ... | ... |

820

| APPLICATION | PRINT MODULE | PRINTING PERMISSION | ONE-SIDE PRINTING PERMISSION | COLOR PRINTING PERMISSION | Nup PRINTING PERMISSION |
|---|---|---|---|---|---|
| SCHEDULER | schedule.exe | Yes | Yes | Yes | 1up |
| BUDGET MANAGEMENT | budget.exe | Yes | No | No | 2up |
| ... | ... | ... | ... | ... | ... |

FIG. 15

USER A  WORD PROCESSOR                                          900

```
<PRINT RESTRICTION TICKET>
  <PERMISSION DETAILS>
    <ACCOUNT NAME> USER A </ACCOUNT NAME>
      <PRINTING PERMISSION> Yes </PRINTING PERMISSION>
      <ONE-SIDE PRINTING PERMISSION> Yes </ONE-SIDE PRINTING PERMISSION>
      <COLOR PRINTING PERMISSION> Yes </COLOR PRINTING PERMISSION>
      <Nup PRINTING PERMISSION> 2 </Nup PRINTING PERMISSION>
  </PERMISSION DETAILS>
  <SIGNATURE> XXXXX </SIGNATURE>
</PRINT RESTRICTION TICKET>
```

USER A  SCHEDULER                                               910

```
<PRINT RESTRICTION TICKET>
  <PERMISSION DETAILS>
    <ACCOUNT NAME> USER A </ACCOUNT NAME>
      <PRINTING PERMISSION> Yes </PRINTING PERMISSION>
      <ONE-SIDE PRINTING PERMISSION> Yes </ONE-SIDE PRINTING PERMISSION>
      <COLOR PRINTING PERMISSION> Yes </COLOR PRINTING PERMISSION>
      <Nup PRINTING PERMISSION> 1 </Nup PRINTING PERMISSION>
  </PERMISSION DETAILS>
  <SIGNATURE> XXXXX </SIGNATURE>
</PRINT RESTRICTION TICKET>
```

PRINTING SYSTEM, PRINTING METHOD AND PRINTER WHICH FACILITATE PRINT MANAGEMENT USING AUTHORIZATION TOKENS

BACKGROUND OF THE INVENTION

1. Field of the Invention

The present invention relates to a printing system in which image data generated by a host computer is transmitted to an image processing apparatus via a network so as to perform printing.

2. Description of the Related Art

In conventional printing systems, reduction in TCO (Total Cost of Ownership) including costs for consumable supplies such as print paper, colorants such as toner or the like has been drawing more attention from a standpoint of reduction in office expenses and protection of global environment.

With a current network printer, all users who have access to the network can use the printer, no user is subject to print restriction and no print history is recorded. Therefore unnecessary printing is often performed, leading to an increase in office expenses.

In order to prevent such an increase, it has been proposed to place print restrictions based on address information such as IP addresses in TCP/IP and to manage the number of printings by recording print logs. However, in the former proposal, it has been impossible to perform detailed management, such as limiting the number of output printings by a particular user. Also, the latter proposal goes against the goal of TCO reduction since a high labor cost is incurred when monitoring print logs to check for unauthorized printing.

In order to solve the above issues, Japanese Patent Laid-Open No. 2003-150336 (paragraph No. 0160) proposes a user-specific restriction function that restricts the number of output printings for each user. Conventionally, management has been possible for restriction of the number of printings only. However, Japanese Patent Laid-Open No. 2003-150336 discloses a system in which it is possible to manage restrictions on two-sided printing and N-up printing that are capable of reducing the number of sheets outputted from the printer, and also restrictions on color/monochrome printing for suppressing toner consumption, on a user-by-user basis.

Furthermore, conventionally there have been cases in which although a user is required to output a work report using a work management application and submit the report, the remaining number of printings allocated to that user is zero. In such cases, there has been a demand for ability to disable the restriction on the number of printings. There has also been demand for the ability to disable the restriction of a print function such as N-up printing when outputting from a certain application for the reason of output appearance.

In order to meet these demands, Japanese Patent Laid-Open No. 2007-293703 (paragraph No. 0080) discloses a system in which detailed management of printing is possible, that is, management is specific to each application used for printing, each document to be printed, each host computer that executes printing and the like, in addition to management specific to each user.

FIG. 13 is a diagram illustrating an operation sequence in a conventional system composed of a host device 100 and a printer 200. In step S401, a user who desires to perform printing inputs account information with the host device 100. The account information used herein contains a user name for identifying a user and a password for authenticating the user. In step S402, the host device 100 acquires a condition other than the user account information subject to print function restriction. Here, the host device 100 acquires the print module name of an application used for printing. In step S403, the host device 100 sends the user account information and the condition subject to the print function restriction to the printer 200. Next, in step S404, the printer 200 confirms that the user account information is valid. Description on conventional user account information will be given below. FIG. 14 illustrates an example of user account information managed by the printer 200. Numeral 800 indicates user authentication information. The user authentication information manages user names, a password for each user, and groups to which the users belong. Based on the user authentication information 800, validity of the user account information is confirmed. Based on the user account information and the condition subject to print function restriction, a printing authorization token is generated. Numeral 810 in FIG. 14 indicates group-specific print permission information. Permissions for printing, one-side printing, color printing, and N-up printing are managed for each group. Numeral 820 in FIG. 14 indicates application-specific print restriction information. Permissions for printing, one-side printing, color printing, and N-up printing are managed for each application. The printer 200 generates a printing authorization token by performing an operation using the user authentication information 800, the group-specific print permission information 810 and the application-specific print restriction information 820.

FIG. 15 illustrates examples of a conventional printing authorization token. For example, when a user A performs printing with a word processor, the printer 200 generates a printing authorization token 900 based on the print permission information 810 of a supervisor group. When the user A desires to use a scheduler, the printer 200 generates a printing authorization token 910 based on the print permission information of the scheduler. In this manner, the printer 200 generates printing authorization tokens through computation based on the user account information and print function restriction. The printing authorization token is affixed with a digital signature in order to prevent falsification.

Referring to FIG. 13 again, in step S405, the printer 200 transmits the printing authorization token generated in step S404. In step S406, the host device 100 reads content of the acquired printing authorization token, and places a restriction on the print function in the print job. In step S407, a PDL command containing the print function restriction placed in step S406 is generated.

FIG. 16 illustrates an example of a generated PDL command. A PDL command 1000 is made up of a PDL header 1001, a printing authorization token 1002, and a PDL body 1003. The PDL header 1001 contains print function settings for the entire print job. The printing authorization token 1002 is supplied from the printer 200 in step S405, and based on the information therein, it is verified whether the print function is properly restricted in the printer 200. The PDL body 1003 contains information on the print function, drawing content and so on for the print page. In step S408, the host device 100 transmits the PDL command 1000 generated in step S407 to the printer 200. In step S409, the printer 200 confirms whether the printing authorization token 1002 exists in the PDL command 1000, refers to the content thereof, and verifies whether or not the PDL header 1001 and print functions in PDL body 1003 are properly applied. In step S410, when determined that print functions are properly applied, printing for the PDL command 1000 is performed.

The operation of a conventional printing system has been described above. In a typical user environment, however, the number of host devices is larger than the number of printers. The process for generating the printing authorization token in step S404 is made up of user authentication processing, database access, printing authorization synthesizing processing, and affixing a digital signature to the printing authorization token, which involve data search and computational load. Also, it is required to perform the process for generating the printing authorization token separately for each condition subject to print function restriction. Therefore, when a plurality of host devices simultaneously request for authorization of print user and acquiring the printing authorization token, processing load is concentrated on the printer, and sometimes response from the printer is delayed.

Here, a method is conceived in which information on all conditions are generated in advance and stored for the purpose of reducing the load for generating printing authorization tokens. However, even with such a method, an issue of storage capacity remains and thus the method is not practical. A method is also conceived in which a conventional technique is improved such that an authentication server is separately provided so as to distribute the computational load. However, even with such a method, provision of a separate host device for operating a server is required and the purchase cost and management cost increases, which poses the problem that the TCO is not reduced. As another method, a method is conceived in which the host device caches printing authorization tokens for reuse. However, since printing authorization tokens differ for each condition subject to print function restriction, the capacity required to cache the printing authorization tokens in the host device increases, which makes the management of the device complicated.

SUMMARY OF THE INVENTION

The present invention allows realization of a printing system capable of preventing an increase in processing load for restricting print function.

One aspect of the present invention provides a printing system constituted from a host device that includes an application for accepting a print instruction and generates a print command, and a printer that is connected to the host device via a network and executes printing in accordance with the generated print command, the system comprises an authentication unit configured to authenticate a user of the host device, a token generating unit configured to generate, after the user has been authenticated by the authentication unit, a token containing print function restriction information by referring to information in which the user, the application and the print function restriction information are associated with one another, and transmit the token to the host device, a command generating unit configured to receive the token generated by the token generating unit, generate a command containing the print function restriction information, and transmit the command to the printer, and a printing unit configured to receive the command generated by the command generating unit, and execute printing that is subject to restriction on print functions.

Further features of the present invention will become apparent from the following description of exemplary embodiments (with reference to the attached drawings).

BRIEF DESCRIPTION OF THE DRAWINGS

FIG. 3 illustrates a module configuration of a printer of the embodiment.

FIG. 4 illustrates user authentication information and group-specific print permission information that are stored in an account information storage unit of the printer.

FIG. 5 is a diagram illustrating a process sequence between the host device and the printer of the embodiment.

FIG. 6 illustrates an example of a user authentication dialog box.

FIG. 7 illustrates examples of a printing authorization token.

FIG. 12 illustrates another example of user authentication information and group-specific print permission information stored in the account information storage unit.

FIG. 14 illustrates user authentication information, and group-specific print permission information and application-specific print information in conventional techniques.

FIG. 15 illustrates an example of a conventional printing authorization token.

DESCRIPTION OF THE EMBODIMENTS

A preferred embodiment of the present invention will now be described in detail with reference to the drawings. It should be noted that the relative arrangement of the components, the numerical expressions and numerical values set forth in these embodiments do not limit the scope of the present invention unless it is specifically stated otherwise.

Figure 1:
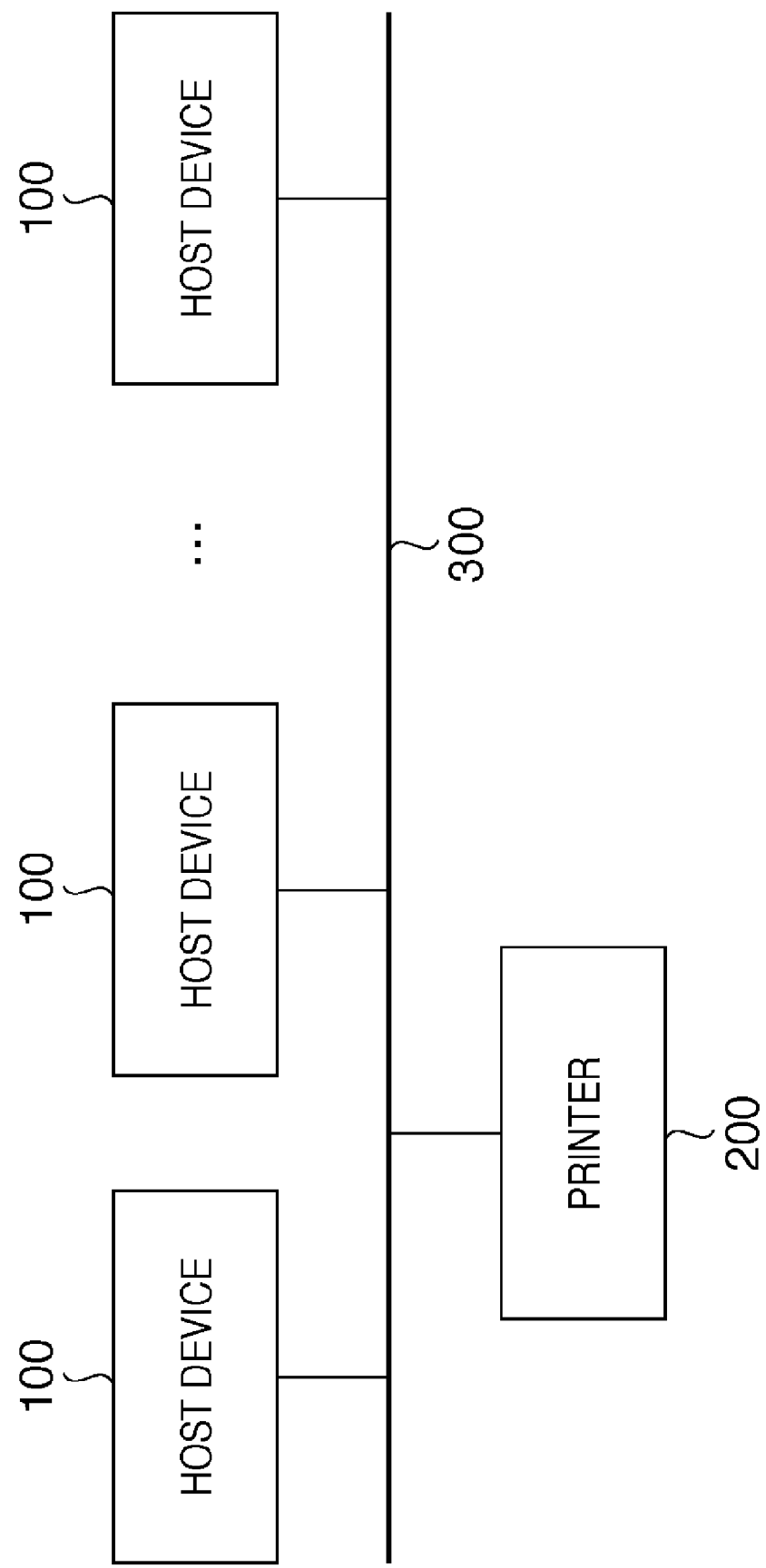
FIG. 1 illustrates a typical system configuration of an embodiment of the present invention.

FIG. 1 illustrates a typical system configuration of an embodiment of the present invention. As shown in FIG. 1, a plurality of host devices 100 and a printer 200 are connected to one another via a network 300. In the present embodiment, the printer 200 authenticates user accounts and issues printing authorization tokens. A plurality of printers 200 may be used in the present embodiment. In general, the number of host device 100 is larger than that of the printer 200. Therefore, there are cases in which a plurality of host devices 100 simultaneously request the printer 200 to authenticate user accounts and issue printing authorization tokens.

Figure 2:
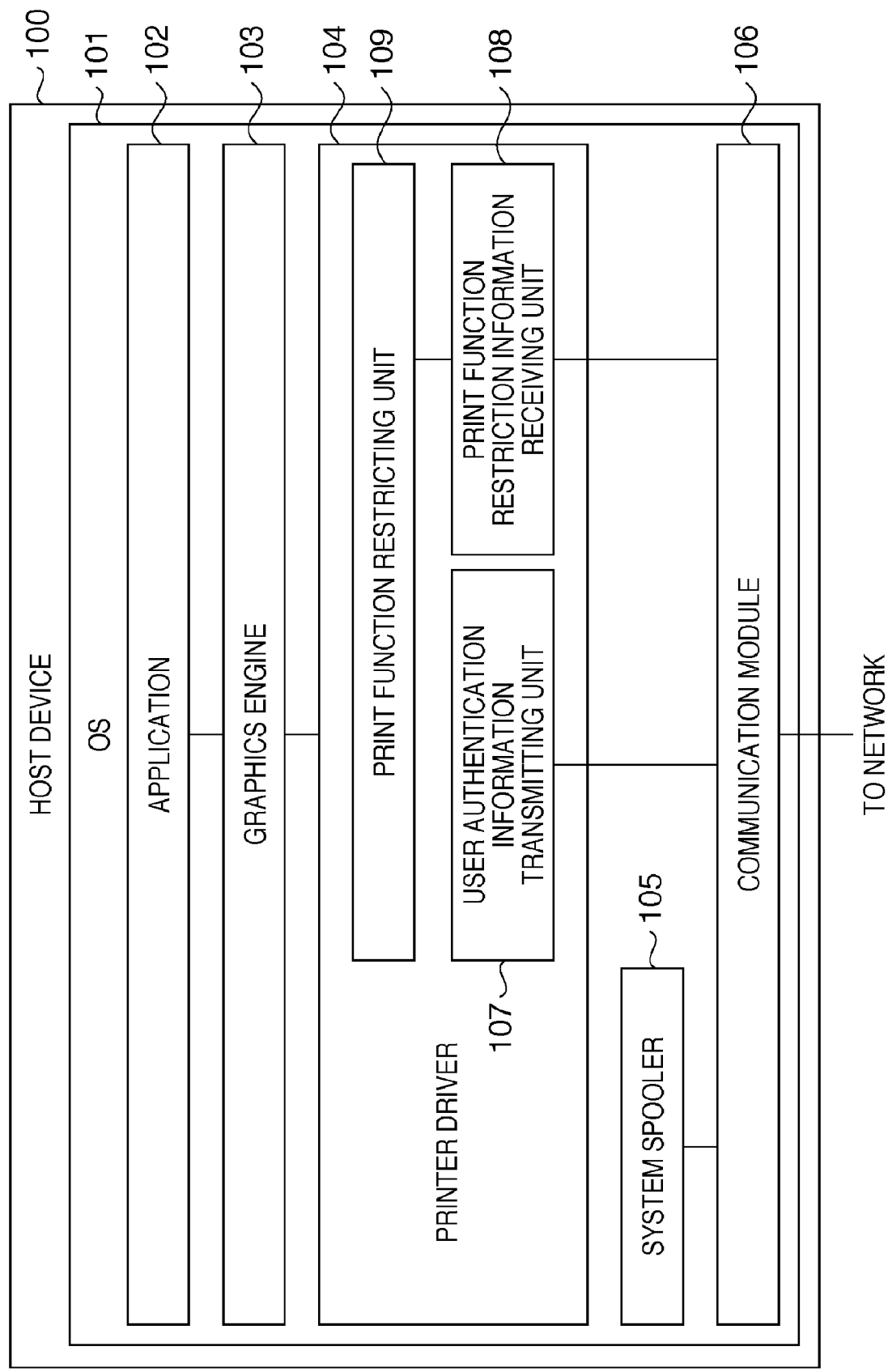
FIG. 2 illustrates a module configuration of a host device of the embodiment.

FIG. 2 illustrates a module configuration of the host device 100 of the present embodiment. First, a typical flow of print processing performed by the host device 100 will be described. An OS 101 operates on the host device 100, the OS 101 providing basic functions such as access to files and network communication. An application 102, typical examples of which include word processing software, spreadsheet software and the like, runs on the OS 101. The host device 100 is capable of accepting print instructions from outside (user) with the application 102. The application 102 issues a print instruction to a printer driver 104 through a graphics engine 103 provided by the OS 101. The graphics engine 103 invokes the printer driver 104 provided by the vendor of the printer 200, and converts the print instruction into a PDL command that the printer 200 can interpret. The printer driver 104 converts the print function set by the user such as two-sided printing, color printing and N-up printing and a drawing command describing drawing to be rendered on the print page supplied from the graphics engine 103 into a PDL command that the printer 200 can interpret. The printer drive 104 forwards the PDL command obtained by conversion to a system spooler 105 provided by the OS 101. The system spooler 105 uses a communication module 106 to transmit the PDL command via the network 300 to the printer 200 that actually outputs printings.

In the present embodiment, the printer driver 104 includes a user authentication information transmitting unit 107, a print function restriction information receiving unit 108, and a print function restricting unit 109. The user authentication information transmitting unit 107 and the print function restriction information receiving unit 108 are connected to a network via the communication module 106. In a case of printing, the user authentication information transmitting unit 107 performs processing for collecting user account information of a user who attempts to perform printing, and transferring the information to a printer. The print function restriction information receiving unit 108 performs processing for receiving a printing authorization token generated by the printer 200 based on the user account information, and forwarding the printing authorization token to the print function restricting unit 109. The print function restricting unit 109 restricts print functions in accordance with the content of the printing authorization token. The print function restricting unit 109 also modifies PDL commands in order to prevent falsification and the like.

FIG. 3 illustrates a module configuration of the printer 200 of the present embodiment. A typical print operation will be described first. The printer 200 connects to the network 300 via a communication module 201. Upon receiving a PDL command, the communication module 201 forwards the PDL command to a print job analyzing unit 204. The print job analyzing unit 204 analyzes the PDL command, and separates the PDL command into print function information such as N-up printing, which is set by the user, and drawing command information describing drawing to be rendered on the print page. The print job analyzing unit 204 forwards the print function information and drawing command information to a print function control unit 206 and a print image generating unit 208, respectively. The print function control unit 206 analyzes the print function information, and requests an optional device control unit 207 for functions such as two-sided printing that are implemented mechanically by an optional device. In addition, the print function control unit 206 requests the print image generating unit 208 for functions relating to drawing such as color printing and N-up printing. The optional device control unit 207 controls optional devices at the request of the print function control unit 206. The print image generating unit 208 converts the drawing command information describing drawing to be rendered on the print page into an image that a printer engine 210 can process, while taking into account a request from the print function control unit 206, that is, color printing, N-up printing or the like. The image generated by the print image generating unit 208 is temporarily stored in a print image storage unit 209, and then printed on a medium such as paper by the printer engine 210.

In the present embodiment, the printer 200 further includes a print function restriction information generating unit 202, an account information storage unit 203, and a print job determination unit 205. The print function restriction information generating unit 202 connects to a network via the communication module 201. The account information storage unit 203 holds user authentication information 400 and group-specific print permission information 410 shown in FIG. 4. FIG. 4 will be described later. The print function restriction information generating unit 202 receives user account information sent by the host device 100, and authenticates the user and issues a printing authorization token based on the information stored in the account information storage unit 203.

The print job determination unit 205 verifies the PDL command received by the printer 200.

The process sequence between the host device 100 and the printer 200 of the present embodiment will be described with reference to FIG. 5. The user uses the application 102 to issue a print instruction with the host device 100. The application 102 issues a print instruction via the graphics engine 103 provided by the OS 101. The graphics engine 103 invokes the printer driver 104 provided by the vendor of the printer 200. The flow described so far is the same as the typical flow of print processing described above. In step S100, the printer driver 104 invokes the user authentication information transmitting unit 107, and displays a user authentication dialog box 600 shown in FIG. 6 for prompting the user to input user account information. The user inputs user account information in a user name box 601 and a password box 602, which are input fields of the user authentication dialog box 600, and presses an OK button 603. The user authentication information transmitting unit 107 acquires the information inputted in the user authentication dialog box 600 as the user account information.

Next, in step S101, the user authentication information transmitting unit 107 sends the acquired user account information to the printer 200 via a network, and requests the printer 200 for a printing authorization token. In general, it is problematic from a security perspective to distribute the user account information on the network as is, so various encryption techniques may be used.

In step S102, the communication module 201 receives the user account information and forwards the information to the print function restriction information generating unit 202. The print function restriction information generating unit 202 verifies whether or not the user account information forwarded by the host device 100 is valid based on the user authentication information 400 shown in FIG. 4. If the user account information is valid, the print function restriction information generating unit 202 calls the user's group information having a highest priority, and obtains the corresponding information on permitted print functions from the group-specific print permission information 410 shown in FIG. 4. The print function restriction information generating unit 202 generates the printing authorization token shown in FIG. 7 based on the obtained information.

Next, in step S103, the print function restriction information generating unit 202 transmits the printing authorization token to the host device 100 via the communication module 201. In the present embodiment, the printing authorization token is affixed with a signature for preventing falsification, similarly to the conventional printing authorization tokens 900 and 910 shown in FIG. 15. However, unlike the conventional printing authorization tokens 900 and 910, the printing authorization token of the present embodiment contains the whole of the print function restriction details for each condition subject to print function restriction.

In step S104, the print function restriction information receiving unit 108 receives the printing authorization token via the communication module 106. In addition, the print function restriction information receiving unit 108 uses a function of the OS 101 to acquire the name of the print execution module of the application 102 that issued the current print instruction, the name of the print execution module being the condition subject to print function restriction. The print function restriction information receiving unit 108 forwards the printing authorization token and the name of the print execution module as the condition subject to print function restriction, to the print function restricting unit 109.

Figure 8:
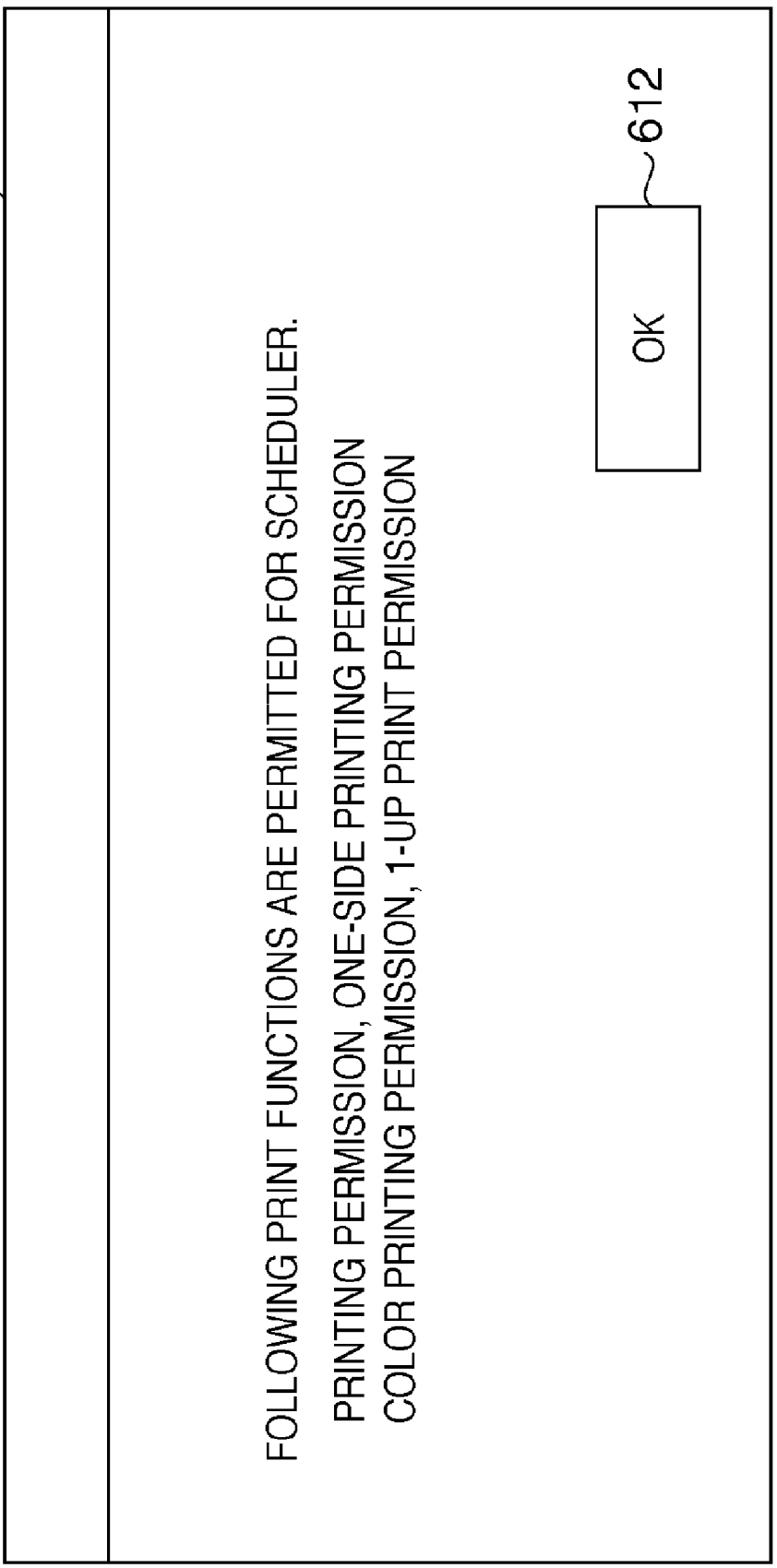
FIG. 8 illustrates an example of a dialog box notifying a user of applied print function restriction.

Next, in step S105, the print function restricting unit 109 reads from the printing authorization token the print function restriction details corresponding to the name of print execution module as the condition subject to print function restriction. Here, in the case where the name of the print execution module is not contained in the printing authorization token, standard permitted print functions are applied. Based on the read print function restriction details, print function restriction is displayed to the user through a user interface (in the present embodiment, a dialog box 610 shown in FIG. 8 notifying the user of application of print function restriction). In the dialog box 610, the application name between <general name> tags contained in the printing authorization token (for example, "scheduler") and permitted print functions (for example, "printing permission, one-side printing permission, color printing permission, 1-up printing permission") are displayed. When the user presses an OK BUTTON 612, the dialog box 610 is closed. After confirmation by the user, the print function restricting unit 109 causes the printer driver 104 to apply print function restriction according to the print function restriction details contained in the printing authorization token corresponding to the name of the print execution module as the condition subject to print function restriction. The printer driver 104 generates the PDL command.

Figure 9:
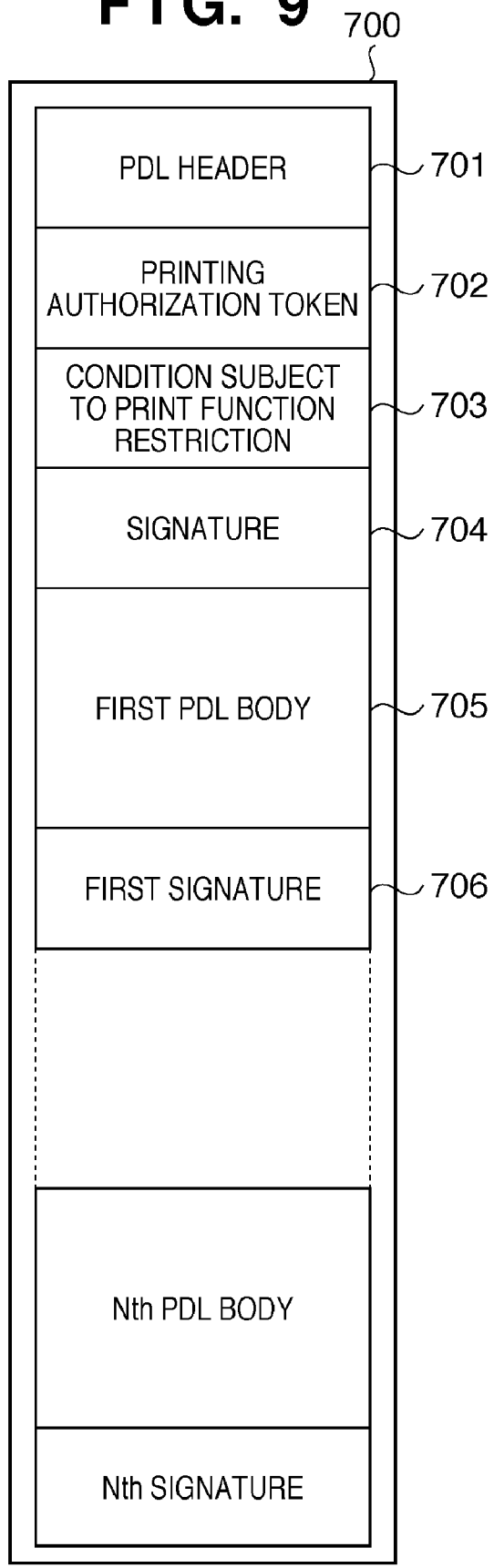
FIG. 9 illustrates an example of a PDL command on which falsification prevention processing has been performed.

In step S106, the print function restricting unit 109 inserts a printing authorization token 702 into the PDL command generated by the printer driver 104, and also adds a condition 703 subject to print function restriction such as the name of a print execution module (if the PDL command involves any condition subject to print function restriction). Also, in order to prevent falsification of the PDL command by a malicious person, the print function restricting unit 109 divides the PDL command into pieces, and affixes a digital signature to each of the pieces. An example of a PDL command 700 on which falsification prevention processing has been performed is shown in FIG. 9. A signature 704 is a signature for three pieces of the PDL command 700, namely a PDL header 701, the printing authorization token 702, and the condition 703 subject to the print function restriction. A first signature 706 relates to the signature 704 and a first PDL body 705. Each subsequent piece contains a PDL body followed by a signature relating to the PDL body and the previous signature. Causing each signature to relate to the previous signature enables digitally signing the entire PDL command.

Next in step S107, the printer driver 104 forwards the generated PDL command 700 to the system spooler 105 as in a typical print processing flow. The system spooler 105 uses the communication module 106 to transmit the PDL command 700 to the printer 200 via the network 300. That is, the host device 100 transmits the PDL command to the printer 200 in step S107 in response to the printing authorization token received in step S104.

In step S108, in the printer 200, the print job analyzing unit 204 receives the PDL command 700 via the communication module 201. The print job analyzing unit 204 forwards the PDL command 700 to the print job determination unit 205. The print job determination unit 205 first verifies whether or not the PDL command 700 has been falsified, and whether or not each piece of the PDL command and the signature thereof match. Next, the print job determination unit 205 requests the print function restriction information generating unit 202 to verify whether or not the signature of the printing authorization token is valid. Finally, the print job determination unit 205 verifies whether or not the condition subject to print function restriction of the PDL command 700 matches the print function information. In the case of non-matching, print function restriction is not applied to the print function information.

In step S109, the PDL command 700 verified by the print job determination unit 205 is again forwarded to the print job analyzing unit 204, and printing is performed with a normal print processing sequence.

FIG. 4 will be described here. FIG. 4 illustrates the user authentication information 400 and the group-specific print permission information 410 that are stored in the account information storage unit 203 of the printer 200. The user authentication information 400 manages a plurality of user names and passwords thereof, and groups to which the users belong. For example, a row 401 contains user authentication information on the user A and indicates that the user A belongs to groups "supervisor" and "general". In the present embodiment, it is assumed that "group 1" has a higher priority than "group 2". By using the group-specific print permission information 410, it is possible to manage print function permission details of groups. Unlike the conventional example shown in FIG. 14, the information relating to the name of the print execution module as the condition subject to print function restriction is also managed in the same table. For example, standard permitted print functions for the supervisor group are managed in a row 411. Also, the permitted print functions for when a user in the supervisor group uses a scheduler are managed in a row 412. Further, general names for applications are also managed in the same table under the second column as "application name". Based on this information, the application names are displayed in the dialog box shown in FIG. 8 displaying permitted print functions.

FIG. 7 illustrates an example of printing authorization token. The user authentication information 400 and the group-specific print permission information 410 shown in FIG. 4 are used to generate information of the printing authorization token. A printing authorization token 500 for the user A represents the row 401 of the user authentication information 400 and the rows 411 and 412 and a row 413 of the group-specific print permission information 410 shown in FIG. 4 in XML format. A printing authorization token 510 for the user B represents the row 402 of the user authentication information 400 and rows 414 and 415 of the group-specific print permission information 410 shown in FIG. 4 in XML format. Both printing authorization tokens contain signature information between <signature> tags. This signature relates to information on the elements described below <permission details> tag, and is for preventing falsification of the printing authorization token.

Figure 10:
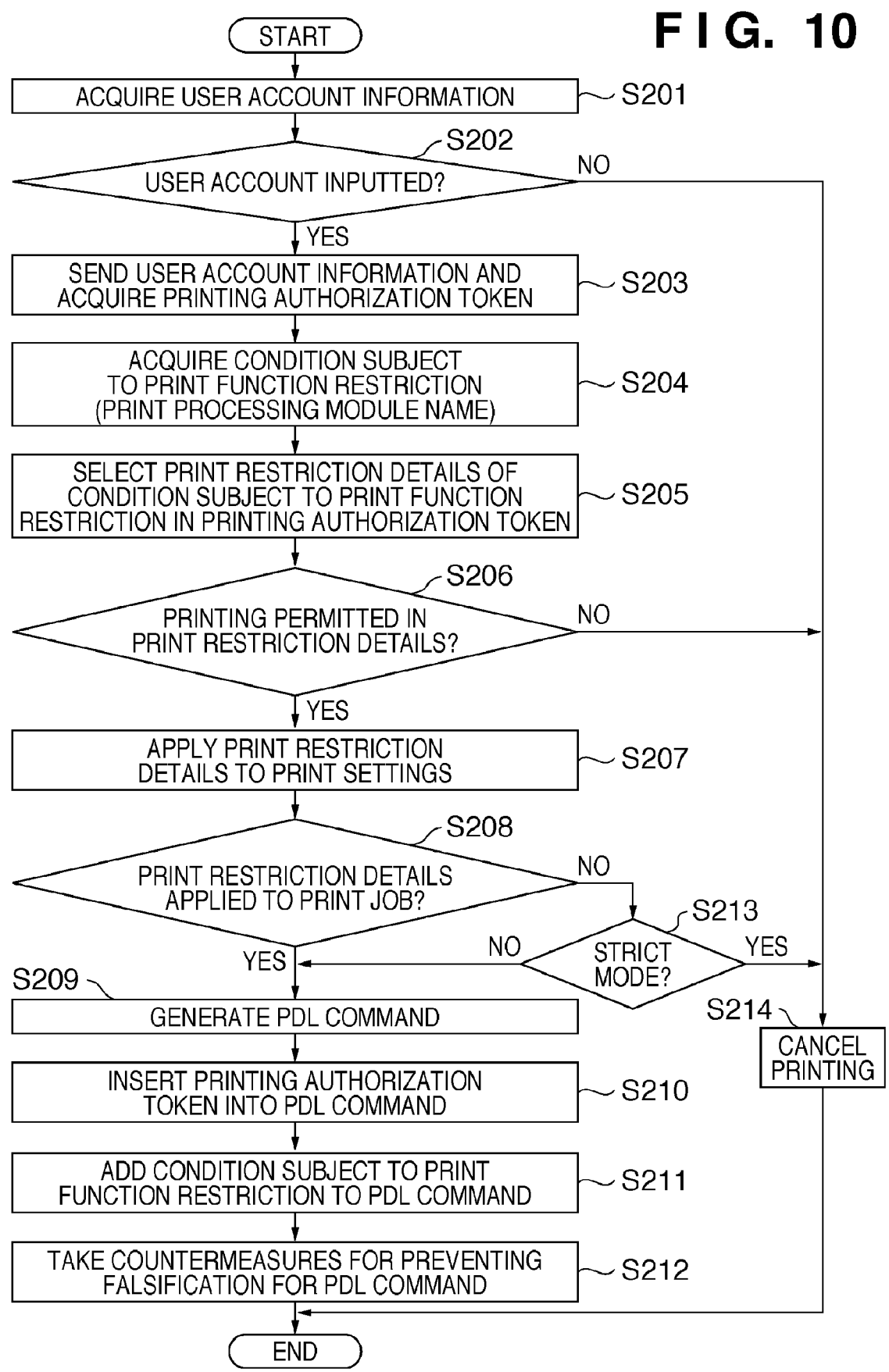
FIG. 10 is a flowchart illustrating a process sequence performed by the host device of the present embodiment.

FIG. 10 is a flowchart illustrating a process sequence performed by the host device 100 of the present embodiment. The processing performed by the host device 100 will be described below. In step S201, the printer driver 104 invokes the user authentication information transmitting unit 107 and displays the user authentication dialog box 600 shown in FIG. 6 for prompting the user to input user account information.

Next, in step S202, the user inputs the user account information in the user name box 601 and password box 602, which are input fields of the user authentication dialog box 600. When the user presses the OK button 603 here, the user account information is received and the procedure proceeds to step S203. Meanwhile, when the user presses a cancel button 604, the procedure proceeds to step S214 and printing is canceled. A case in which the user A requests authentication will be described below. In step S203, the user authentication information transmitting unit 107 transmits the acquired user account information to the printer 200 via the network 300. The print function restriction information receiving unit 108 receives the printing authorization token 500 for the user A via the communication module 106.

In step S204, the print function restriction information receiving unit 108 uses the functions of the OS 101 to acquire the condition subject to print function restriction. In the present embodiment, the name of the print execution module of the application that executes printing is acquired as the condition. For example, in the case of a scheduler, the name of execution module, "schedule.exe" is acquired. The print function restriction information receiving unit 108 forwards the printing authorization token 500 and the condition subject to the print function restriction to the print function restricting unit 109.

Next in step S205, the print function restricting unit 109 reads, from the printing authorization token 500, print function restriction details corresponding to the condition subject to print function restriction. For example, in the case where the condition subject to print function restriction is "schedule.exe", information between <application permission> tags containing "schedule.exe" as the module name attribute is used as the current print function restriction details. If the name of the print execution module is not contained in the printing authorization token, standard permitted print functions are used. Based on the read print function restriction details, the dialog box 610 shown in FIG. 8 that notifies the user of application of print function restriction is displayed to the user. The application name between <general name> tags contained in the printing authorization token (for example, "scheduler") and permitted print functions (for example, "printing permission, one-side printing permission, color printing permission, 1-up print permission") are displayed in the dialog box 610. When the user presses the OK button 612, the dialog box 610 is closed.

In step S206, if printing is permitted under the current print function restriction details, the procedure proceeds to step S207. In contrast, if printing is not permitted, the procedure proceeds to step S214, and printing is cancelled.

Next, in step S207, the printer driver 104 uses the print function restricting unit 109 to apply print function restriction based on the print function restriction details corresponding to the name of the print execution module as the condition subject to the print function restriction contained in the printing authorization token.

In step S208, there are cases in which the printer driver 104 does not apply the print function restriction in step S207. For example, in the case where the user has selected OHP sheet when one-side printing is not permitted, it is meaningless to instruct the printer driver 104 to perform two-sided printing. Therefore print function restriction is not applied. For this reason, confirmation is made as to whether or not the print function restriction was actually applied. Here, if determination is affirmative, the procedure proceeds to step S209. If determination is negative, the procedure proceeds to step S213.

Next, in step S209, the printer driver 104 generates the PDL command according to print settings.

In step S210, the print function restricting unit 109 inserts the printing authorization token 702 into the PDL command generated by the printer driver 104.

Next, in step S211, the print function restricting unit 109 adds, to the PDL command generated by the printer driver 104, the condition 703 such as the name of print execution module subject to the print function restriction.

In step S212, the print function restricting unit 109 divides the PDL command into pieces, and affixes a digital signature to each of the pieces. An example of the PDL command 700 on which falsification prevention processing has been performed is shown in FIG. 9. The signature 704 is a signature for the PDL header 701, printing authorization token 702, and the condition 703 subject to the print function restriction. The first signature 706 relates to the first PDL body 705. For subsequent pieces, a signature for a PDL body is added following that PDL body, so that the PDL command 700 on which falsification prevention processing has been performed is generated (generation of PDL command).

In step S213, in the exemplary case where the user has selected OHP sheet when one-side printing is not permitted, it is meaningless to instruct the printer driver 104 to perform two-sided printing. Therefore print function restriction is not applied. A supervisor defines whether such a state in which the print restriction is not applied should be managed in a strict sense to cancel printing. This is hereinafter referred to as "strict mode". When the printer driver 104 does not apply the print function restriction in step S207, and the supervisor has set the strict mode, the procedures proceeds to step S214, and printing is canceled. Meanwhile, when the strict mode is not set, the procedure proceeds to step S209 and printing is continued.

Figure 11:
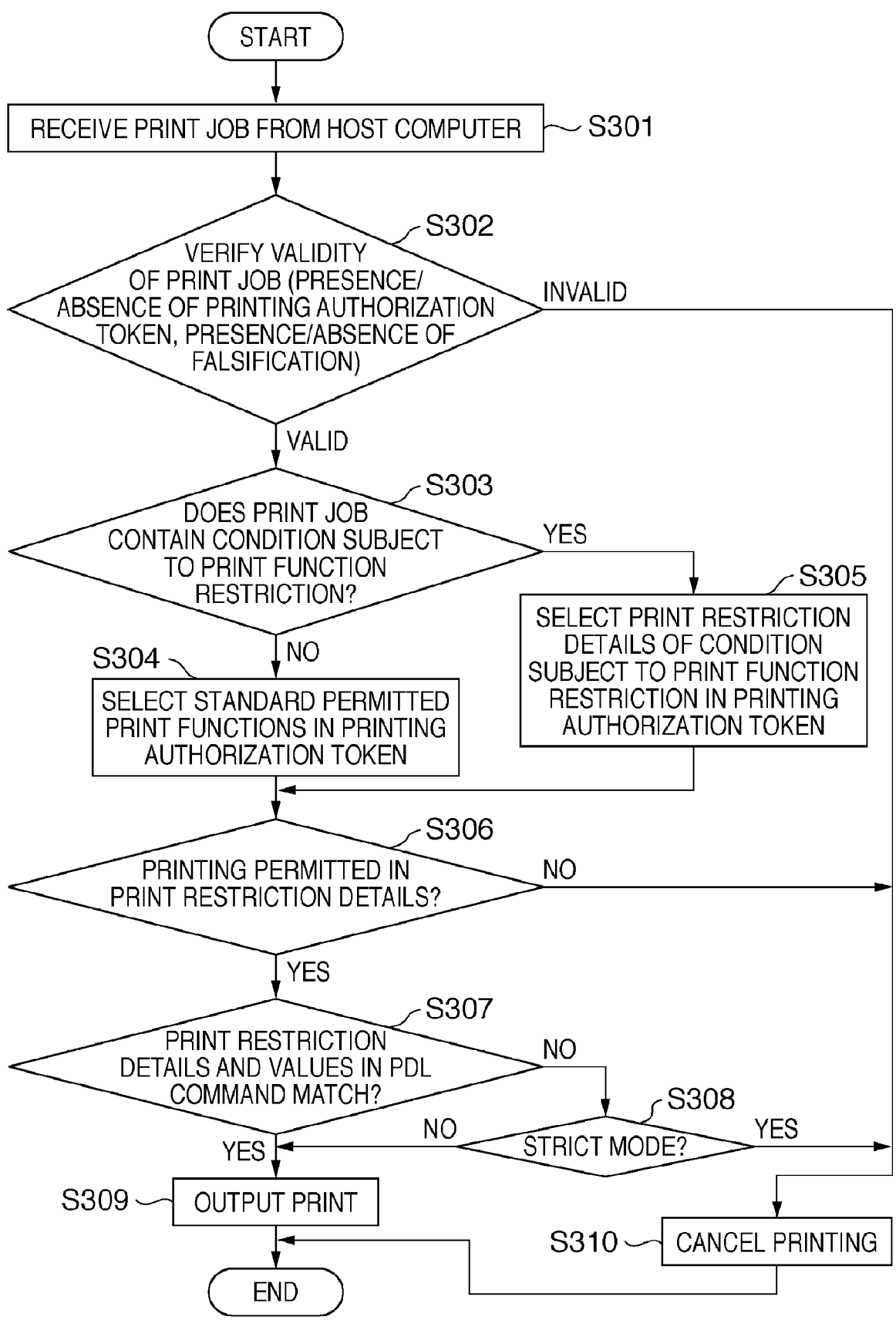
FIG. 11 is a flowchart illustrating a process sequence performed by the printer after receiving a PDL command of the present embodiment.
Figure 13:
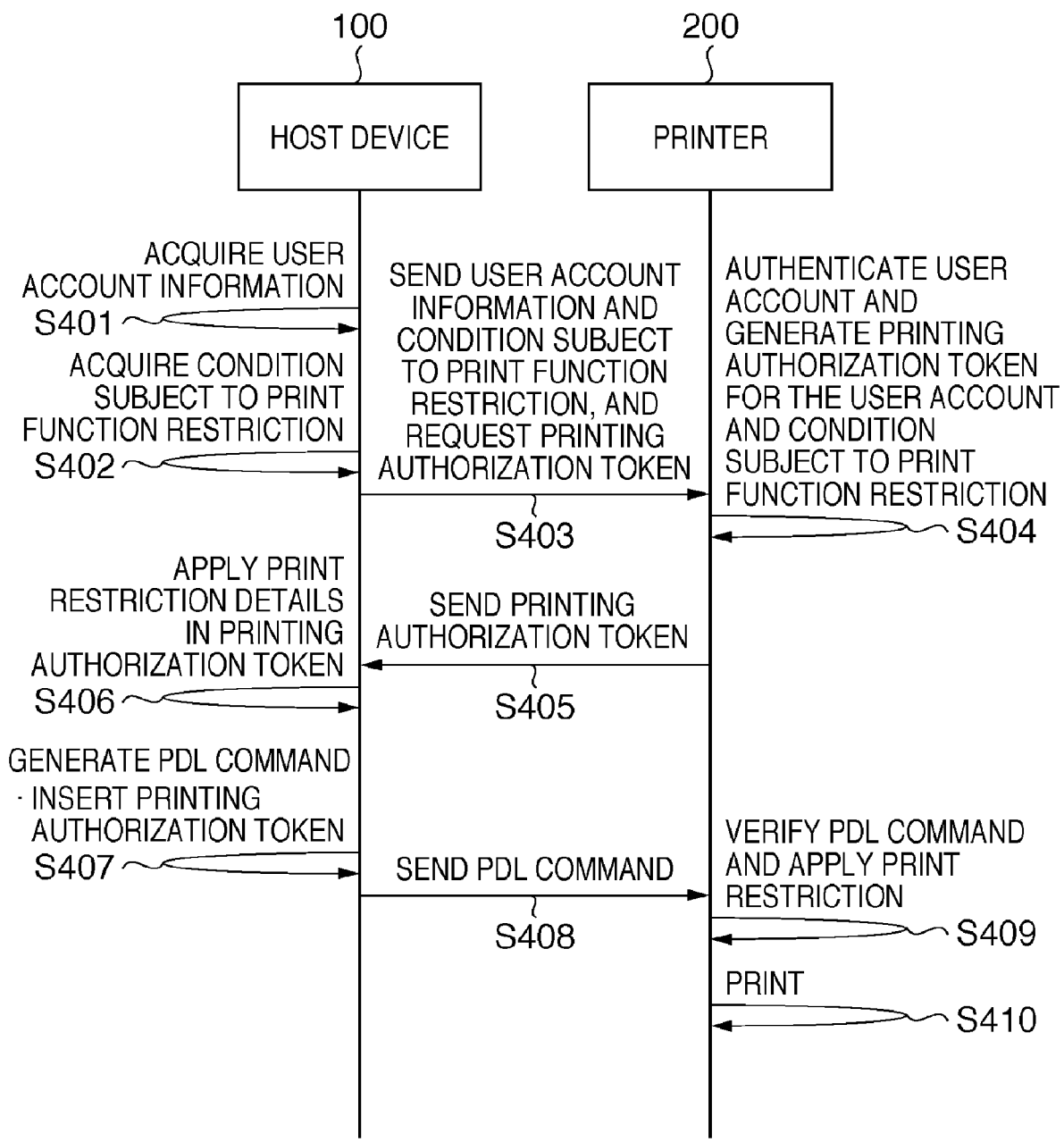
FIG. 13 is a diagram illustrating a conventional process sequence between the host device and the printer.
Figure 16:
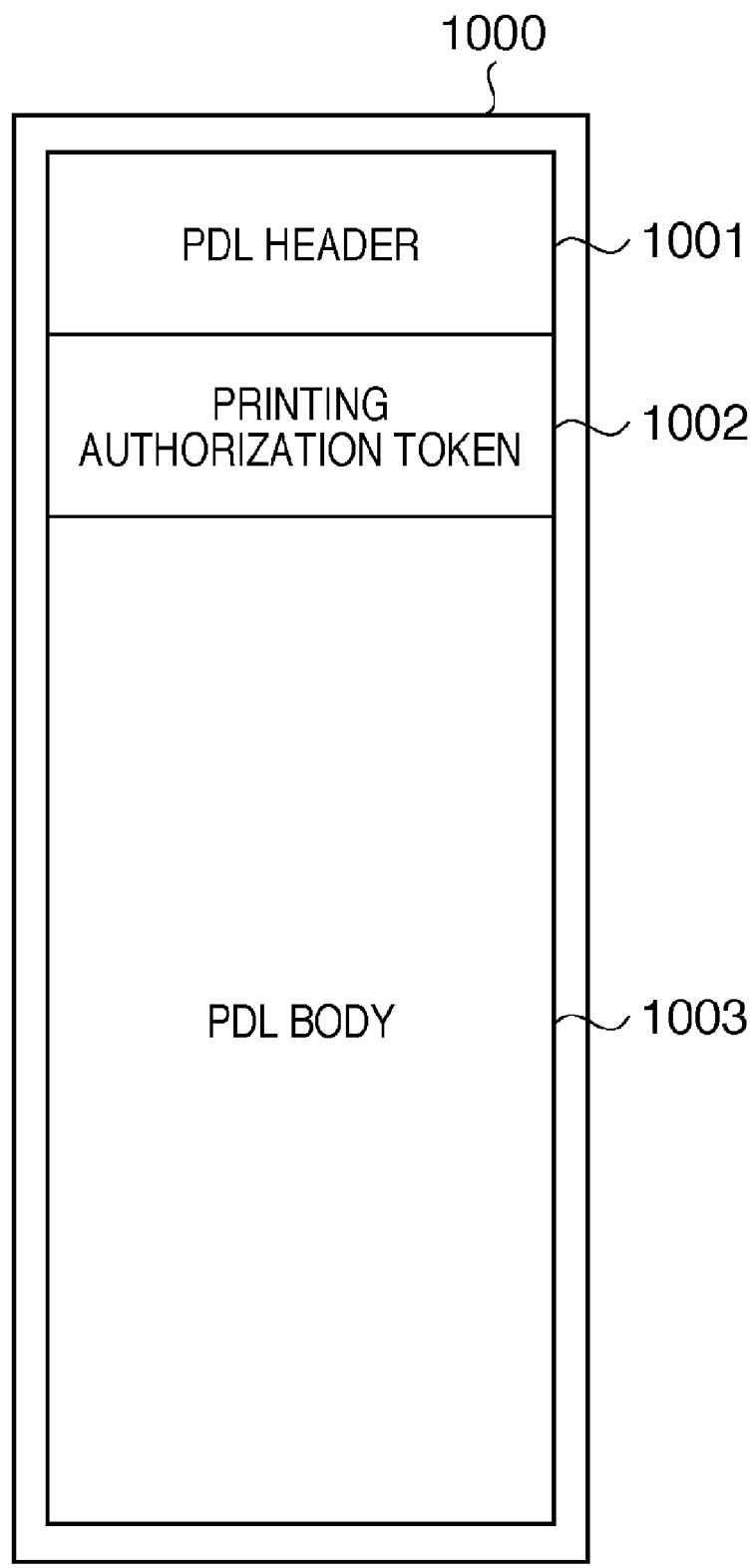
FIG. 16 illustrates an example of a conventionally generated PDL command.

FIG. 11 is a flowchart illustrating a process sequence performed by the printer 200 after receiving the PDL command of the present embodiment. Processing performed by the printer 200 after receiving the PDL command will be described below.

In step S301, in the printer 200, the print job analyzing unit 204 receives the PDL command 700 via the communication module 201. The print job analyzing unit 204 forwards the PDL command 700 to the print job determination unit 205.

Next, in step S302, the print job determination unit 205 first verifies whether or not the PDL command 700 has been falsified, and whether or not each piece of the PDL command and the signature thereof match. Next, the print job determination unit 205 requests the print function restriction information generating unit 202 to verify whether or not the signature of the printing authorization token is valid. If no falsification is found by the verification, the procedure proceeds to step S303. If any falsification is found, the procedures proceeds to step S310 and printing is cancelled.

In step S303, the print job determination unit 205 confirms whether the PDL command 700 contains a condition subject to the print function restriction. When the condition subject to the print function restriction is not contained, the procedure proceeds to step S304, and standard restriction in the printing authorization token is selected as the print function restriction details. When the condition subject to the print function restriction is contained, the procedure proceeds to step S305, and restriction corresponding to that condition in the printing authorization token is selected as the print function restriction details.

In step S304, the print job determination unit 205 selects standard restriction in the printing authorization token as the current print function restriction details. In step S305, the print job determination unit 205 selects restriction corresponding to that condition in the printing authorization token as the current print function restriction details.

Next, in step S306, the print job determination unit 205 determines whether or not printing is permitted under the current print function restriction details. If determination is affirmative, the procedure proceeds to step S307. In contrast, if determination is negative, the procedure proceeds to step S310, and printing is cancelled.

In step S307, the print job determination unit 205 determines whether or not the current print function restriction details match the print function information of the PDL command. If determination is affirmative, the procedure proceeds to step S309. If determination is negative, the procedure proceeds to step S308.

In step S308, in the case where the supervisor has set the strict mode, the procedure proceeds to step S310 and printing is cancelled. In the case where the strict mode is not set, the procedure proceeds to step S309.

In step S309, the PDL command 700 verified by the print job determination unit 205 is again forwarded to the print job analyzing unit 204, and printing is performed with a normal print processing sequence.

As described so far, in the present embodiment, it is possible to generate a printing authorization token in which the user, application and print function restriction information are associated with one another, by referring to the user authentication information and the group-specific print permission information as shown in FIG. 4. As a result, no operation is required between tables, and therefore processing performed by of the printer can be simplified. Note that the printing authorization token may be generated in a method other than referring to a table in which the user, application and print function restriction information are associated with one another, as described above. For example, the printing authorization token may be generated by referring to information in which the user, application and print function restriction information are associated with one another, through an algorithm judging flow instead of referring to a table.

In the present embodiment, in the case where it is desired to set a restricted number of printings for each department, user authentication information 1100 and group-specific print permission information 1110 are stored in the account information storage unit 203, as shown in FIG. 12. The printer 200 counts the number of printings for each department and invalidates the printing permission when the restricted number of printings is exceeded, thereby setting a restricted number of printings for each department. In the case where permitting printing is desired for a particular application even when the restricted number of printings is exceeded, print permission may be provided only for that particular application.

Unlike the conventional printing authorization token shown in FIG. 15, the printing authorization token shown in FIG. 7 contains all of the information regarding the conditions subject to the print function restriction relating to the user. Therefore, a printing authorization token generated for a certain user does not change unless the user authentication information 400 and the group-specific print permission information 410 of that user change, which are shown in FIG. 4 and stored in the account information storage unit 203. Accordingly, the print function restriction information generating unit 202 may temporarily cache the generated printing authorization tokens for each user, and use the tokens again in response to the request for a printing authorization token.

Also, by holding the printing authorization token for a certain period of time in the user authentication information transmitting unit 107 of the host device 100, it is possible to reuse the printing authorization token for a certain period of time without issuing a request for the token to the printer 200. In the present embodiment, although the printer 200 authenticates the user accounts and issues the printing authorization tokens, a configuration is possible in which an alternative server is separately provided such that the server authenticates user accounts and issues printing authorization tokens.

With the present embodiment, an increase in the processing load can be suppressed in the process for print function restriction.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-039096 filed on Feb. 20, 2008, which is hereby incorporated by reference herein in its entirety.

What is claimed is:

1. A printing system having a host device that includes an application for accepting a print instruction and generates a print command, and a printer that is connected to the host device via a network and executes printing in accordance with the generated print command, the system comprising:
   an authentication unit configured to authenticate a user of the host device;
   a token generating unit configured to generate, after the user has been authenticated by the authentication unit, a token containing print function restriction information by referring to information in which the user, the application and the print function restriction information are associated with one another, and transmit the token to the host device;
   a command generating unit configured to receive the token generated by the token generating unit, generate a command containing the print function restriction information, and transmit the command to the printer; and
   a printing unit configured to receive the command generated by the command generating unit, and execute printing that is subject to restriction on print functions.

2. The printing system according to claim 1, wherein the token generated by the token generating unit and the command generated by the command generating unit have been encrypted.

3. The printing system according to claim 1, further comprising a display unit configured to display to the user the print function restriction information using a user interface.

4. A printing method implemented in a printing system having a host device that accepts a print instruction from outside and generates a print command, and a printer that is connected to the host device via a network and executes printing in accordance with the generated command, the method comprising the steps of:
   authenticating a user based on account information inputted by the user using the host device;
   generating, after the user has been authenticated in the authenticating step, a token containing print function restriction information by referring to information in which the user, an application and the print function restriction information are associated with one another;
   generating a command containing the print function restriction information based on the generated token, and
   executing printing that is subject to restriction on print functions in accordance with the generated command.

5. A printer connected via a network to a host device that includes an application for accepting a print instruction from outside and generates a print command, the printer executing printing in accordance with the generated command, the printer comprising:
   an authentication unit configured to authenticate a user based on account information inputted by the user using the host device; and a token generating unit configured to generate, after the user has been authenticated by the authentication unit, a token containing print function restriction information by referring to information in which the user, the application and the print function restriction information are associated with one another, and transmit the token to the host device, wherein the printer executes printing that is subject to restriction on print functions as a result of receiving a command containing the print function restriction information that has been transmitted by the host device in response to the token.

* * * * *